(12) United States Patent
Wang et al.

(10) Patent No.: US 10,104,727 B2
(45) Date of Patent: Oct. 16, 2018

(54) SILICON-CONTROLLED RECTIFIER-COMPATIBLE CONSTANT-VOLTAGE CIRCUIT, LED DIMMING CIRCUIT, AND RELATED LED LIGHTING APPARATUS

(71) Applicant: SENGLED OPTOELECTRONICS CO., LTD., Tongxiang (CN)

(72) Inventors: Zhonghua Wang, Tongxiang (CN); Haiyang Yu, Tongxiang (CN); Junshan Lou, Tongxiang (CN); Jinxiang Shen, Tongxiang (CN)

(73) Assignee: SENGLED OPTOELECTRONICS CO., LTD., Tongxiang (CN)

( * ) Notice: Subject to any disclaimer, the term of this patent is extended or adjusted under 35 U.S.C. 154(b) by 247 days.

(21) Appl. No.: 15/109,094

(22) PCT Filed: Jan. 8, 2016

(86) PCT No.: PCT/CN2016/070507
§ 371 (c)(1),
(2) Date: Jun. 29, 2016

(87) PCT Pub. No.: WO2016/112828
PCT Pub. Date: Jul. 21, 2016

(65) Prior Publication Data
US 2018/0199404 A1 Jul. 12, 2018

(30) Foreign Application Priority Data
Jan. 15, 2015 (CN) .......................... 2015 1 0020461

(51) Int. Cl.
*H02M 1/36* (2007.01)
*H05B 33/08* (2006.01)

(52) U.S. Cl.
CPC .......... *H05B 33/0815* (2013.01); *H02M 1/36* (2013.01); *H05B 33/089* (2013.01); *H05B 33/0887* (2013.01); *Y02B 20/341* (2013.01)

(58) Field of Classification Search
CPC ...... H02H 7/125; H02M 1/32; H02M 1/4225; H02M 2001/007; H02M 3/156;
(Continued)

(56) References Cited

U.S. PATENT DOCUMENTS 6,194,885 B1 * 2/2001 Oshima ............... H02M 1/4225
323/285
2002/0047636 A1 4/2002 Yamamoto et al.
(Continued)

FOREIGN PATENT DOCUMENTS

CN 102238777 A 11/2011
CN 102752929 A 10/2012
(Continued)

OTHER PUBLICATIONS

The World Intellectual Property Organization (WIPO) International Search Report for PCT/CN2016/070507 dated Mar. 24, 2016.
(Continued)

*Primary Examiner* — Alexander H Taningco
*Assistant Examiner* — Renan Luque
(74) *Attorney, Agent, or Firm* — Anova Law Group, PLLC (57) ABSTRACT

A silicon-controlled rectifier (SCR)-compatible constant-voltage circuit that includes an input undervoltage control module, an overpower protection module, a controllable load module, and a power conversion module is provided. The input undervoltage control module, the overpower protection module, and the controllable load module are connected in parallel between a first sampling point and the power conversion module, and the first sampling point is
(Continued)

arranged between an SCR and the power conversion module. The power conversion module is configured to provide a constant voltage to a load module. The input undervoltage control module and the overpower protection module are configured to control the power conversion module to start or stop power conversion based on a voltage at the first sampling point. The controllable load module is configured to maintain the SCR to be on when the power conversion module stops power conversion.

12 Claims, 4 Drawing Sheets

(58) Field of Classification Search
CPC .... H02M 3/33507; H02M 5/257; H02M 7/06; Y02B 20/341; Y02B 20/346; Y02B 20/347; Y02B 20/348; Y02B 70/126; H05B 33/0812; H05B 33/0815; H05B 33/0818; H05B 33/0827; H05B 33/083; H05B 33/0842; H05B 33/0845; H05B 33/0851; H05B 33/0887; H05B 33/089; H05B 37/02; H05B 41/2855; H05B 41/2985
See application file for complete search history.

(56) References Cited

U.S. PATENT DOCUMENTS

| | | | | |
|---|---|---|---|---|
| 2011/0101867 A1* | 5/2011 | Wang | | H05B 33/0818 315/127 |
| 2012/0044723 A1* | 2/2012 | Lin | | H02M 3/33507 363/21.13 |
| 2012/0188794 A1* | 7/2012 | Chang | | H02M 3/33507 363/16 |
| 2012/0242237 A1 | 9/2012 | Chen et al. | | |
| 2012/0262084 A1* | 10/2012 | Liu | | H05B 33/0815 315/250 |
| 2014/0375223 A1* | 12/2014 | Tao | | H05B 33/0815 315/186 |
| 2015/0173153 A1* | 6/2015 | Hsiu | | H05B 33/0815 315/200 R |
| 2015/0263510 A1* | 9/2015 | Yang | | H05B 33/0887 315/119 |
| 2015/0366018 A1* | 12/2015 | Kuang | | H05B 33/0848 315/206 |
| 2016/0066388 A1* | 3/2016 | Seki | | H05B 33/0815 315/200 R |

FOREIGN PATENT DOCUMENTS

| | | |
|---|---|---|
| CN | 103491689 A | 1/2014 |
| CN | 104619083 A | 5/2015 |
| CN | 204539541 U | 8/2015 |
| EP | 2741585 A2 | 11/2014 |
| JP | H11299231 A | 10/1999 |
| WO | 2011063505 A1 | 5/2011 |

OTHER PUBLICATIONS

European Patent Office (EPO) Supplementary European Search Report for EP Application No. 16737054.3 dated May 11, 2018 10 pages.

* cited by examiner

SILICON-CONTROLLED RECTIFIER-COMPATIBLE CONSTANT-VOLTAGE CIRCUIT, LED DIMMING CIRCUIT, AND RELATED LED LIGHTING APPARATUS

CROSS-REFERENCES TO RELATED APPLICATIONS

This application is a national phase entry under 35 U.S.C. § 371 of International Application No. PCT/CN2016/070507, filed on Jan. 08, 2016, which claims priority to Chinese Patent Application No. 201510020461.X filed on Jan. 15, 2015. The above enumerated patent applications are incorporated by reference herein in their entirety.

FIELD OF THE DISCLOSURE

The present disclosure relates to the field of light emitting diode (LED) technologies and, more particularly, relates to a silicon-controlled rectifier (SCR)-compatible constant-voltage circuit, a light-emitting diode (LED) dimming circuit, and a related LED lighting apparatus.

BACKGROUND

A silicon-controlled rectifier (SCR) is a four-layered high-power semiconductor device with three p-n junctions. A SCR is also referred to as a thyristor. SCRs have advantages such as being small, having relatively simple structures and high performance. Thus SCRs have been widely used in various electronic devices and electronic products. SCRs are mainly used as rectifiers, inverters, frequency converters, voltage regulators, non-contact switches, etc. For example, many home appliances such as dimmer lights, speed-controllable fans, air conditioners, televisions, refrigerators, washing machines, cameras, audio systems, acousto-optic circuits, timing controllers, toy devices, radio remote control devices, video cameras, and industrial control devices, include SCRs as components.

Existing SCR applications are mainly used in constant-current regulation circuits. However, currently, more and more circuits require constant-voltage regulation. Thus, it is critical to improve the compatibility of the SCRs and provide constant voltages to the loads. It is thus desirable to develop stable and reliable regulation methods.

The disclosed systems and methods are directed to solve one or more problems set forth above and other problems.

BRIEF SUMMARY OF THE DISCLOSURE

One aspect or embodiment of the present disclosure provides a silicon-controlled rectifier (SCR)-compatible constant-voltage circuit. The circuit includes an input undervoltage control module, an overpower protection module, a controllable load module, and a power conversion module. Further, one terminal of a SCR is connected to the power conversion module, and another terminal of the SCR is connected to a power supply module. The input undervoltage control module, the overpower protection module, and the controllable load module are each connected in parallel between a first sampling point and the power conversion module, the first sampling point being arranged between the SCR and the power conversion module. The power conversion module is connected to a load module and is configured to convert electric signals provided by the power supply module to a constant voltage, the power conversion module providing the constant voltage to the load module. The input undervoltage control module is configured to control the power conversion module to start or stop power conversion based on a comparison between a voltage at the first sampling point and a first reference voltage. The overpower protection module is configured to control the power conversion module to start or stop power conversion based on a comparison between the voltage at the first sampling point and a second reference voltage. The controllable load module is configured to maintain the SCR to be on when the power conversion module stops power conversion.

Another aspect or embodiment of the present disclosure includes a light-emitting diode (LED) dimming circuit. The circuit includes a silicon-controlled rectifier (SCR) dimmer and the SCR-compatible constant-voltage circuit as described above. Further, one terminal of the SCR dimmer is connected to the power supply module. The SCR-compatible constant-voltage circuit is connected to another terminal of the SCR dimmer and one or more LED lighting components to provide a constant voltage for the one or more LED lighting components.

Another aspect or embodiment of the present disclosure includes a light-emitting diode (LED) lighting device. The device includes the LED dimming circuit as described above and the one or more LED lighting components. The LED dimming circuit is connected to the one or more LED lighting components.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiment, persons of ordinary skill in the art may derive other embodiments consistent with the present disclosure, all of which are within the scope of the present invention.

Figure 1:
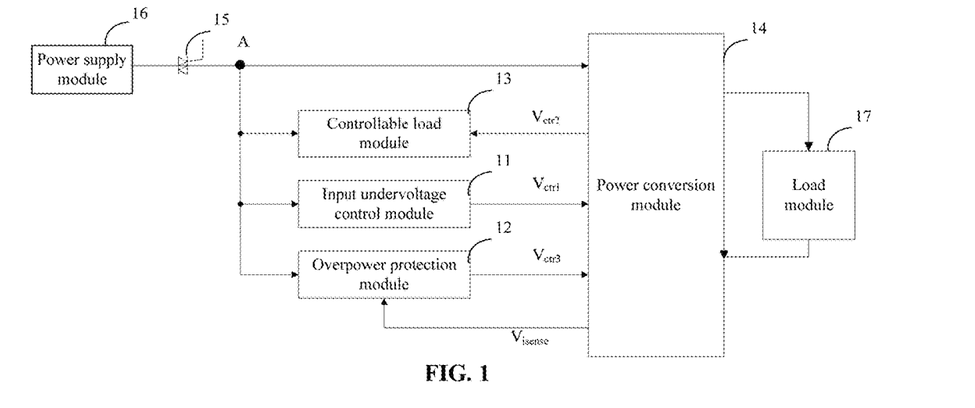
FIG. 1 is a block diagram illustrating an exemplary SCR-compatible constant-voltage circuit consistent with various embodiments of the present disclosure.
Figure 2A:
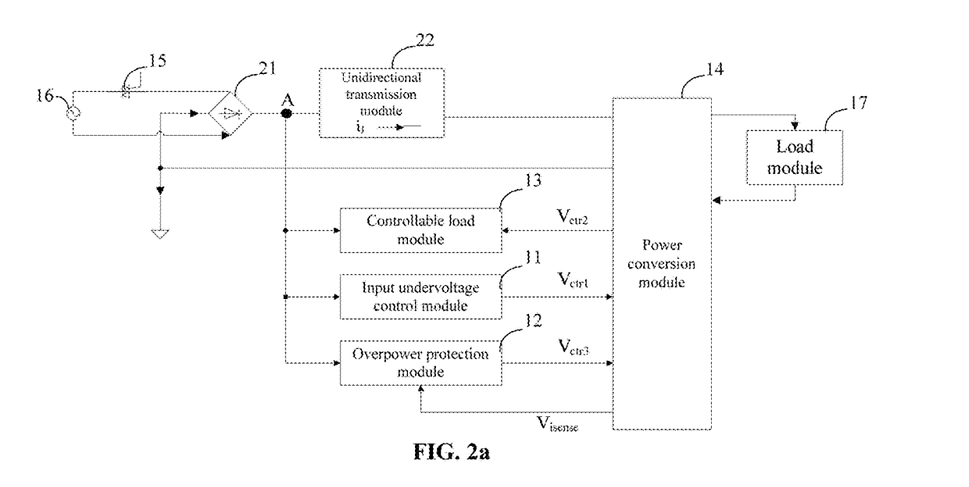
FIG. 2a is a block diagram illustrating another exemplary SCR-compatible constant-voltage circuit consistent with various embodiments of the present disclosure.
Figure 2B:
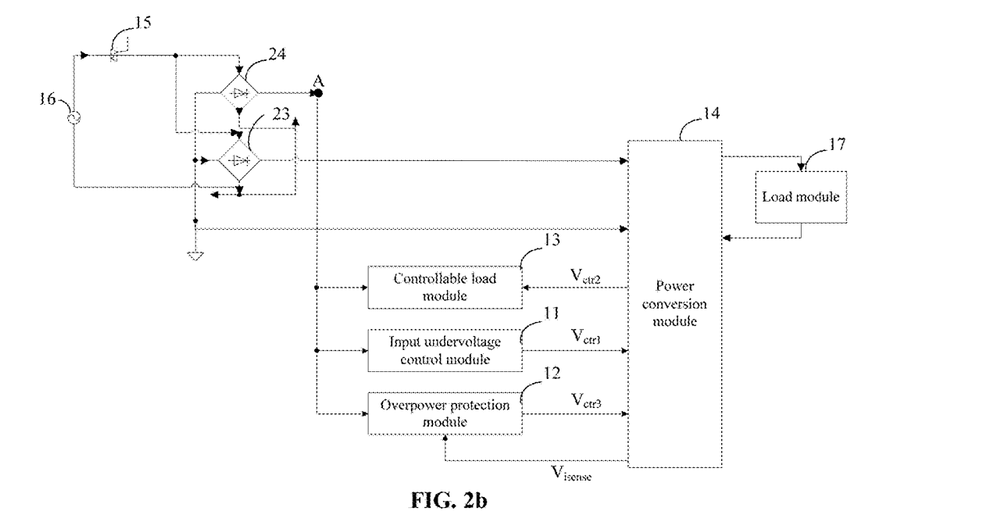
FIG. 2b is a block diagram illustrating another exemplary SCR-compatible constant-voltage circuit consistent with various embodiments of the present disclosure.
Figure 2C:
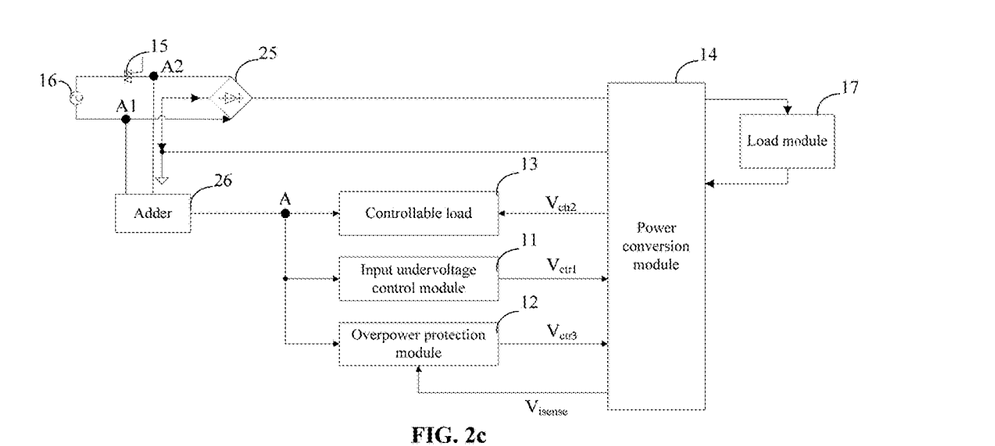
FIG. 2c is a block diagram illustrating another exemplary SCR-compatible constant-voltage circuit consistent with various embodiments of the present disclosure.

It should be noted that, for illustrative purposes and viewing simplicity, the power supply module 16 in the present disclosure are represented by a block in FIGS. 1, and 3-5, and represented by an AC current source in FIG. 2. This indicates no difference in the functions or structures of the power supply module.

FIG. 1 illustrates the structure of an exemplary SCR-compatible constant-voltage circuit provided by the first embodiment of the present disclosure. As shown in FIG. 1, the SCR-compatible constant-voltage circuit may include an input undervoltage control module 11, an overpower protection module 12, a controllable load module 13, and a power conversion module 14.

The power conversion module 14 may be connected to one terminal of the SCR 15. The other terminal of the SCR 15 may be connected to a power supply module 16. Each one of the input undervoltage control module 11, the overpower protection module 12, and the controllable load module 13 may be connected to both the first sampling point A and the power conversion module 14. The first sampling point A may be arranged to be between the SCR 15 and the power conversion module 14.

The power conversion module 14 may be connected to a load module 17. The power conversion module 14 may be configured to covert power for the electrical signals provided by the power supply module 16, and provide a constant voltage to the load module 17. The input undervoltage control module 11 may be configured to control the power conversion module 14 to start power conversion when the input undervoltage control module 11 detects the voltage at the first sampling point A is higher than a first reference voltage. When the input undervoltage control module 11 detects the voltage at the first sampling point A is equal to or lower than the first reference voltage, the input undervoltage control module 11 may control the power conversion module 14 to stop power conversion. The overpower protection module 12 may be configured to control the power conversion module 14 to stop power conversion when the overpower protection module 12 detects the voltage at the first sampling point A is higher than a second reference voltage. When the overpower protection control module 12 detects the voltage at the first sampling point A is equal to or lower than the second reference voltage, the overpower protection module 12 may control the power conversion module 14 to start power conversion. The controllable load module 13 may be configured to turn on the SCR 15 when the controllable load module 13 detects that the power conversion module 14 has stopped power conversion.

Specifically, the constant-voltage circuit may be connected in parallel between the SCR 15 and the load module 17 and may provide a constant voltage to load module 17. Further, the first sampling point A may be arranged between the SCR 15 and the power conversion module 14. The input undervoltage control module 11, the overpower protection module 12, and the controllable load module 13 may each be connected in parallel between the first sampling point A and the power conversion module 14. The load module 17 may be a fixed load and/or a variable load. For example, the load module 17 may be any suitable home appliances or other suitable circuit modules, e.g., LED lighting components. The specific type of the load module 17 should not be limited by the embodiments of the present disclosure.

In practice, the input of the constant-voltage circuit, provided by the power supply module 16, may be alternating current (AC) or direct current (DC). The SCR 15 may be any suitable types of SCR devices. For example, the SCR 15 may be a triode AC semiconductor switch (TRIAC). The power conversion module 14 may be any suitable devices capable of flyback or forward power conversion modes. The type of the power conversion module 14 should not be limited by the embodiments of the present disclosure.

Specifically, the constant-voltage circuit may have a constant output voltage. That is, the output voltage of the constant-voltage circuit may be constant regardless of the output power of the constant-voltage circuit. When the conduction angle of the SCR 15 is relatively small, for the constant-voltage circuit to output a sufficient output power, the power supply module 16 needs to input a sufficiently high current to the constant-voltage circuit. When the conduction angle of the SCR 15 is relatively large, the output power of the constant-voltage circuit may be high. At this time, for the SCR 15 to maintain reliable conduction, a certain amount of electric current is required to flow through the SCR 15.

To solve the problem that the SCR 15 needs to input a sufficiently high current to the constant-voltage circuit when the conduction angle of the SCR 15 is relatively small, the present disclosure provides the input undervoltage control module 11 in the constant-voltage circuit. The input undervoltage control module 11 may control the start or stop of the power conversion module 14 based on the voltage at the first sampling point A. Specifically, when the conduction angle of the SCR 15 is less than a certain value, e.g., 90 degrees, the input undervoltage control module 11 may output a first control signal $V_{ctr1}$ to the power conversion module 14. The first control signal $V_{ctr1}$ may be configured to control the power conversion module 14 to stop power conversion. The input undervoltage control module 11 and the first control signal $V_{ctr1}$ may ensure reliable operations and input undervoltage protection functions of the constant-voltage circuit.

To solve the problem that the power supply module 16 inputs a high output power to the constant-voltage circuit, the present disclosure provides the overpower protection module 12. When the overpower protection module 12 detects the input power to the constant-voltage circuit is too high, the overpower protection module 12 may send a third control signal $V_{ctr3}$ to the power conversion module 14 based on current $V_{isense}$ and the voltage at the first sampling point A. The current $V_{isense}$ may be a current the power conversion module 14 sends to the overpower protection module 12. The third control signal $V_{ctr3}$ may be used to control the power conversion module 14 to stop power conversion when the overpower protection module 12 detects the input power to the constant-voltage circuit is too high and ensure the safety and reliability of the constant-voltage circuit.

To provide the turn-on current that maintains the on state of the SCR 15, the present disclosure also provides a controllable load module 13 to ensure a certain amount of current flows through the SCR 15 when the SCR 15 is on. The SCR 15 can thus maintain the on-state reliably.

In the SCR-compatible constant-voltage circuit provided by the present disclosure, when the conduction angle of the SCR 15 reduces to a certain value, the input undervoltage control module 11 may control the power conversion module 14 to stop power conversion. When the input power to the constant-voltage circuit is too high, the overpower protection module 12 may control the power conversion module 14 to stop power conversion. The controllable load module 13 may also ensure a certain amount of current to flow through the SCR 15 when the SCR 15 is turned on or at the on state. The current to maintain the on state of the SCR 15, i.e., the turn-on current, may be provided. The SCR 15 may stay conductive reliably. Thus, in a certain conductive angle, the constant-voltage circuit may ensure constant output voltage for a full-range of loads. The constant-voltage circuit may also include overpower protection functions and input undervoltage control protection functions to safely and reliably control the SCR 15. The constant-voltage circuit may thus provide a constant voltage to the load module 17 and implement stable and reliable control of the output voltage.

Specifically, to more accurately implement input undervoltage control functions and overpower protection functions, and to provide a stable turn-on current for the SCR 15, an input voltage detection point, i.e., the first sampling point A, may be required. Specifically, the first sampling point A may be realized in a plurality of ways.

Optionally, FIG. 2*a* illustrates the structure of the SCR-compatible constant-voltage circuit consistent with the second embodiment of the present disclosure. As shown in FIG. 2*a*, the constant-voltage circuit of the second embodiment may include the constant-voltage circuit provided by the first embodiment and a first rectifying module 21. One terminal of the power supply module 16 may be connected to one terminal of the SCR 15. The other terminal of the power supply module 16 may be connected with the first input terminal of the first rectifying module 21. The other terminal of the SCR 15 may be connected with the second input terminal of the first rectifying module 21. The first output terminal of the first rectifying module 21 may be connected to the power conversion module 14. The second output terminal of the first rectifying module 21 may be connected to a low potential and the power conversion module 14, respectively. The first sampling point may be arranged to be between the first rectifying module 21 and the power conversion module 14.

Optionally, to prevent some of the power flowing along a reverse direction in the power conversion module 14 from affecting the accuracy of sampling, the constant-voltage circuit provided by the second embodiment may further include a unidirectional transmission module 22. The first output terminal of the first rectifying module 21 may be connected to one terminal of the unidirectional transmission module 22. The other terminal of the unidirectional transmission module 22 may be connected to the power conversion module 14 to transmit current from the first rectifying module 21 to the power conversion module 14 along a single direction. The first sampling point A may be arranged between the first rectifying module 21 and the unidirectional transmission module 22.

The low potential may include ground or a negative potential, and is not limited by the embodiments of the present disclosure.

Optionally, the first rectifying module 21 may be realized through a plurality of ways. For example, the first rectifying module 21 may be a bridge rectifier. Accordingly, the first rectifying module 21 may include a first rectifying unit and a second rectifying unit connected in parallel. The first rectifying unit may include a first diode and a second diode connected in series. The second rectifying unit may include a third diode and a fourth diode connected in series.

The cathode of the first diode and the cathode of the third diode may be connected to the second output terminal of the first rectifying module 21. The anode of the first diode may be connected to the second input terminal of the first rectifying module 21. The cathode of the fourth diode may be connected to the first input terminal of the first rectifying module 21. The anode of the fourth diode may be connected to the first output terminal of the first rectifying module 21 and the cathode of the second diode. The specific connections between the components in the first rectifying module 21 should not be limited by the embodiments of the present disclosure.

The unidirectional transmission module 22 may also be realized through a plurality of unidirectional conducting devices, such as diodes. Accordingly, the unidirectional transmission module 22 may include one or more diodes. The cathode of the diode may be connected to the first output terminal of the first rectifying module 21. The anode of the diode may be connected to the power conversion module 14. The specific types of the unidirectional transmission module 22 and the connections among the components in the unidirectional transmission module 22 should not be limited by the embodiments of the present disclosure.

In the SCR-compatible constant-voltage circuit provided by the present disclosure, the first rectifying module 21 and the unidirectional transmission module 22 may be arranged between the SCR 15 and the power conversion module 14. The first sampling point A may be arranged between the first rectifying module 21 and the unidirectional transmission module 22. The unidirectional transmission module 22 may control the current to flow from the first rectifying module 21 to the power conversion module 14 along single direction. By using the unidirectional transmission module 22, current may flow along the direction indicated by the current "$i_1$" in FIG. 2. The unidirectional transmission module 22 may prevent power or current in the power conversion module 14 to flow along the opposite direction of the current $i_1$. Thus, the voltage at the first sampling point A may have a same amplitude as the input voltage of the first rectifying module 21. Sampling of the voltages may be more accurate.

Optionally, FIG. 2*b* illustrates the structure of a SCR-compatible constant-voltage circuit provided by the third embodiment of the present disclosure. As shown in FIG. 2*b*, the SCR-compatible constant-voltage circuit provided by the third embodiment may include the SCR-compatible constant-voltage circuit provided by the first embodiment, a second rectifying module 23, and a third rectifying module 24.

One terminal of the power supply module 16 may be connected to one terminal of the SCR 15. The other terminal of the power supply module 16 may be connected to the first input terminal of the second rectifying module 23 and the first input terminal of the third rectifying circuit 24. The other terminal of the SCR 15 may be connected to the second input terminal of the second rectifying module 23 and the second input terminal of the third rectifying module 24. The first output terminal of the second rectifying module 23 may be connected to the power conversion module 14. The second output terminal of the second rectifying module 23 may be connected to a low potential and the power conversion module 14. The second output terminal of the third rectifying module 24 may be connected to the second output terminal of the second rectifying module 23. The first sampling point may be arranged to be on the first output terminal of the third rectifying module 24. The second output terminal of the third rectifying module 24 may be connected to the low potential. The low potential may include the ground or a negative potential, and is not limited by the embodiments of the present disclosure.

Optionally, the second rectifying module 23 and the third rectifying module 24 may be realized through a plurality of ways. For example, the second rectifying module 23 and the third rectifying module 24 may each include a first rectifying unit and a second rectifying unit connected in parallel. The first rectifying unit may include a first diode and a second diode connected in series. The second rectifying unit may include a third diode and a fourth diode connected in series.

The cathode of the first diode and the cathode of the third diode may be connected to the second output terminal of the second rectifying module 23 (or the third rectifying module 24). The anode of the first diode may be connected to the second input terminal of the second rectifying module 23 (or the third rectifying module 24). The cathode of the fourth diode may be connected to the first input terminal of the second rectifying module 23 (or the third rectifying module 24). The anode of the fourth diode may be connected to the first output terminal of the second rectifying module 23 (or the third rectifying module 24) and the cathode of the second diode. The specific connections between the components in the first rectifying module 21 should not be limited by the embodiments of the present disclosure.

Specifically, the SCR 15 may be connected to the second rectifying module 23 and the third rectifying module 24, where the second rectifying module 23 and the third rectifying module 24 may be connected in parallel. The output terminal of the second rectifying module 23 may be connected to the power conversion module 14. The first sampling point A may be arranged on the output terminal of the third rectifying module 24.

In the SCR constant-voltage provided by the present disclosure, the second rectifying module 23 and the third rectifying module 24, connected in parallel, may be arranged between the SCR 15 and the power conversion module 14. The voltage sampling point or the first sampling point A may be arranged on the output terminal of the third rectifying module 24 to prevent power or current in the power conversion module 14 to flow in a reverse direction. The voltage at the first sampling point A and the input voltage of the rectifying modules (i.e., the second rectifying module 23 and the third rectifying module 24) may have the same amplitude. The voltage at the first sampling point A may be more accurately sampled.

Optionally, FIG. 2c illustrates the structure of a SCR-compatible constant-voltage circuit consistent with the fourth embodiment of the present disclosure. As shown in FIG. 2c, the SCR-compatible constant-voltage circuit provided by the fourth embodiment may include the SCR-compatible constant-voltage circuit provided by the first embodiment and a fourth rectifying module 25.

One terminal of the power supply module 16 may be connected to one terminal of the SCR 15. The other terminal of the power supply module 16 may be connected to the first input terminal of the fourth rectifying module 25. The other terminal of the SCR 15 may be connected to the second input terminal of the fourth rectifying module 25. The first output terminal of the fourth rectifying module 25 may be connected to the power conversion module 14. The second output terminal of the fourth rectifying module 25 may be connected to the power conversion module 14 and a low potential. The voltage at the first sampling point A may be a sum of the voltage at the second sampling point A1 and the voltage at the third sampling point A2. As shown in FIG. 2c, the second sampling point A1 may be arranged at the first input terminal of the fourth rectifying module 25; and the third sampling point A2 may be arranged at the second input terminal of the fourth rectifying module 25. The low potential may include ground or a negative potential, and is not limited by the embodiments of the present disclosure.

Optionally, the fourth rectifying module 25 may be realized through a plurality of ways. For example, the fourth rectifying module 25 may be a bridge rectifier. Accordingly, the fourth rectifying module 25 may include a first rectifying unit and a second rectifying unit connected in parallel. The first rectifying unit may include a first diode and a second diode connected in series. The second rectifying unit may include a third diode and a fourth diode connected in series.

The cathode of the first diode and the cathode of the third diode may be connected to the second output terminal of the fourth rectifying module 25. The anode of the first diode may be connected to the second input terminal of the fourth rectifying module 25. The cathode of the fourth diode may be connected to the first input terminal of the fourth rectifying module 25. The anode of the fourth diode may be connected to the first output terminal of the fourth rectifying module 25 and the cathode of the second diode. The specific connections between the components in the fourth rectifying module 25 should not be limited by the embodiments of the present disclosure.

Optionally, for sampling the voltages, the constant-voltage circuit may further include a first adder 26. The first input terminal of the first adder 26 may be connected to first input terminal of the fourth rectifying module 25. The second input terminal of the first adder 26 may be connected to the second input terminal of the fourth rectifying module 25. The first input terminal and the second input terminal of the first adder 26 may be configured to output a first superimposed voltage. The first superimposed voltage may be the sum of the voltages at the second sampling point A1 and the third sampling point A2. Accordingly, the first sampling point A may be arranged at the output terminal of the first adder 26.

Specifically, in one embodiment, the fourth rectifying module 25 may be arranged between the SCR 15 and the power conversion module 14. The first input terminal of the first adder 26 may be connected to the second sampling point A1 at the first input terminal of the fourth rectifying module 25. The second input terminal of the first adder 26 may be connected to the third sampling point A2 at the second input terminal of the fourth rectifying module 25. Accordingly, the first sampling point A may be arranged on the output terminal of the first adder 26. That is, the voltage of the first sampling voltage A may be a sum of the voltages at the second sampling point A1 and at the third sampling point A2.

In the SCR-compatible constant-voltage circuit provided by the present disclosure, the fourth rectifying module 25 may be arranged between the SCR 15 and the power conversion module 14. The second sampling point A1 and the third sampling point A2 may be arranged at the two AC input terminals of the fourth rectifying module 25, respectively. The voltage at the first sampling point may be the sum of the voltages at the second sampling point A1 and the third sampling point A2. The voltage at the first sampling point A may have the same amplitude as the input voltage of the fourth rectifying module 25. The sampling of the first sampling voltage A may be more accurate.

It should be noted that, the first sampling point A may also be realized in any other suitable ways. The specific arrangement of the first sampling point A should not be limited by the embodiments of the present disclosure.

Figure 3:
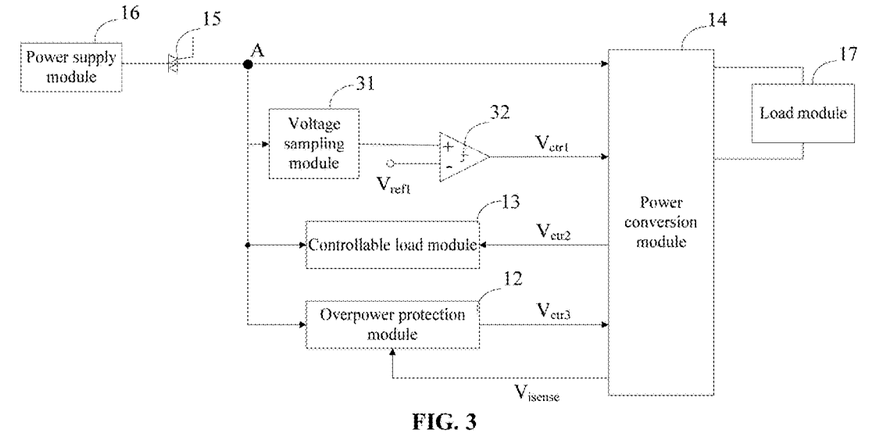
FIG. 3 is a block diagram illustrating another exemplary SCR-compatible constant-voltage circuit consistent with various embodiments of the present disclosure.

Specifically, FIG. 3 illustrates the structure of a SCR-compatible constant-voltage circuit consistent with the fifth embodiment of the present disclosure. As shown in FIG. 3, the SCR-compatible constant-voltage circuit provided by the fifth embodiment may include the SCR-compatible constant-voltage circuit provided by the first embodiment, where the input undervoltage control module 11 may include a first hysteresis comparator 32 and a voltage sampling module 31.

The voltage sampling unit 31 may be configured to sample the voltage value at the first sampling point A for a plurality of times and output an averaged voltage value. The first hysteresis comparator 32 may be connected to the voltage sampling module 31 to compare the averaged voltage value, outputted by the voltage sampling module 31, with a first reference voltage $V_{ref1}$. If the averaged voltage value is greater than the first reference voltage $V_{ref1}$, the first hysteresis comparator 32 may output a high potential to control the power conversion module 14 to start power conversion. If the averaged voltage value is smaller than or equal to the first reference voltage $V_{ref1}$, the first hysteresis comparator 32 may output a low potential to control the power conversion module 14 to stop power conversion.

Specifically, the input undervoltage control module 11 may include the voltage sampling module 31 and the first hysteresis comparator 32. The voltage sampling module 31 may sample the voltage at the first sampling point A for a plurality of times and output the averaged voltage value according to a certain proportion. The first hysteresis comparator 32 may compare the averaged voltage value to the predetermined first reference voltage $V_{ref1}$ and output a control signal $V_{ctr1}$ based on the result of the comparison. The control signal $V_{ctr1}$ may be used to control the power conversion module 14. Further, if the averaged voltage value is greater than the first reference voltage $V_{ref1}$, the first hysteresis comparator 32 may output a high potential to start the power conversion module 14 so that the power conversion module may output a constant voltage. If the averaged voltage value is smaller than or equal to the first reference voltage $V_{ref1}$, the first hysteresis comparator 32 may output a low potential to stop the power conversion module 14. Specifically, in the present disclosure, because the voltages at the first sampling point A are being averaged and compared to the first reference voltage $V_{ref1}$, the sampled voltage values and the averaged voltage value may decrease as the conduction angle of the SCR 15 decreases.

In the SCR-compatible constant-voltage circuit provided by the present disclosure, the input undervoltage control module 11 may include the voltage sampling module 31 and the first hysteresis comparator 32. The voltage sampling module 31 may sample the voltage at the first sampling point A for a plurality of times and output the averaged voltage value. The first hysteresis comparator 32 may compare the averaged voltage value to the first reference voltage $V_{ref1}$ and control the power conversion module 14 based on the result of the comparison. The SCR-compatible constant-voltage circuit may thus be operated with improved reliability and input undervoltage protection functions.

Figure 4:
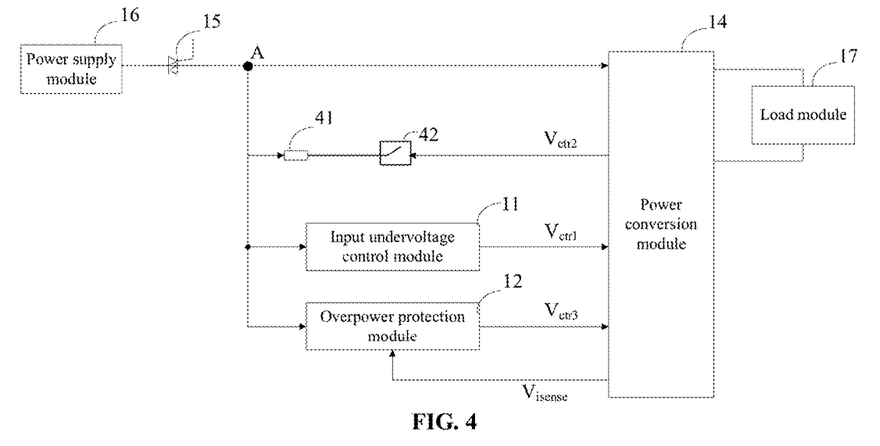
FIG. 4 is a block diagram illustrating another exemplary SCR-compatible constant-voltage circuit consistent with various embodiments of the present disclosure.

More specifically, FIG. 4 illustrates the structure of a SCR-compatible constant-voltage circuit consistent with the sixth embodiment of the present disclosure. As shown in FIG. 4, the SCR-compatible constant-voltage circuit provided by the sixth embodiment may include the SCR-compatible constant-voltage circuit provided by the first embodiment, where the controllable load module 17 may include a resistor 41 and a controllable switch 42.

The controllable switch 42 may be connected to the power conversion module 14. The resistor 41 may be connected to the controllable switch 42 in series. For illustrative purposes, the resistor 41 only shows one resistor. In practice, the resistor 41 may also represent more than one resistors. The controllable switch 42 may be configured to be switched on or connected when the power conversion module 14 stops power conversion.

Specifically, to ensure the SCR 15 to be switched on properly, a certain amount of electric current is required to flow through the SCR 15. Accordingly, in the embodiments of the present disclosure, the certain amount of electric current may be provided through the controllable load module 13. When the power conversion module 14 does not output a constant voltage, the power conversion module 14 may send a second control signal $V_{ctr2}$ to the controllable switch 42 in the controllable load module. The controllable switch 42 may receive the second control signal $V_{ctr2}$ and control the connection so that the resistor 41 may be connected to the SCR 15. The resistor 41 may provide a load for the SCR 15 and thus provide electric current for the SCR 15. Thus, the SCR 15 may be switched on properly.

Figure 5:
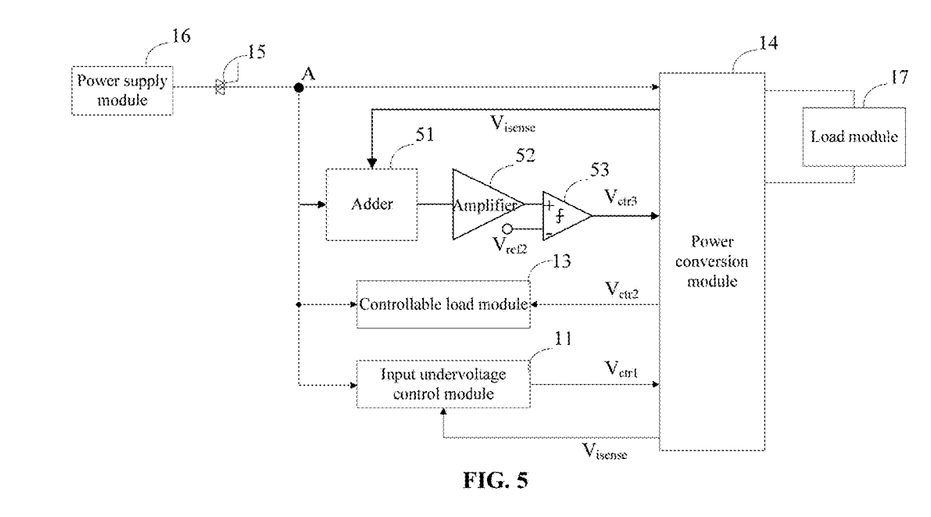
FIG. 5 is a block diagram illustrating another exemplary SCR-compatible constant-voltage circuit consistent with various embodiments of the present disclosure.

More specifically, FIG. 5 illustrates the structure of a SCR-compatible constant-voltage circuit consistent with the seventh embodiment of the present disclosure. As shown in FIG. 5, the SCR-compatible constant-voltage circuit provided by the seventh embodiment may include the SCR-compatible constant-voltage circuit provided by the first embodiment, where the overpower protection module 12 may include a second adder 51, an amplifier 52, and a second hysteresis comparator 53.

The first input terminal of the second adder 51 may be connected to the power conversion module 14. The second input terminal of the second adder 51 may be connected to the first sampling point A to output a second superimposed voltage. The second superimposed voltage may be a superimposition of the voltage at the first sampling point A and the output voltage of the power conversion module 14. The amplifier 52 may be connected to the second adder 51 to amplify the second superimposed voltage. The second hysteresis comparator 53 may be connected to the amplifier 52 to compare the amplified second superimposed voltage with a second reference voltage $V_{ref2}$. If the amplified second superimposed voltage is greater than the second reference voltage $V_{ref2}$, the second hysteresis comparator 53 may output a high potential to control the power conversion module 14 to stop power conversion. If the amplified second superimposed voltage is smaller than or equal to the second reference voltage $V_{ref2}$, the second hysteresis comparator 53 may output a low potential to control the power conversion module 14 to start power conversion.

Specifically, to prevent damages to the parts in the circuit caused by undesirable high output power of the SCR 15 at the maximum conduction angle, the SCR-compatible constant-voltage circuit provided by the present disclosure may include the overpower protection module 12. The overpower protection module 12 may include the second adder 51, the amplifier 52, and the second hysteresis comparator 53. The output signal $V_{isense}$ by the power conversion module 14 and the voltage at the voltage sampling point A may be added or superimposed through the second adder 51. The superimposed voltage may be amplified by the amplifier 52. The second hysteresis comparator 53 may compare the amplified superimposed voltage, i.e., the amplified second superimposed voltage, with the predetermined second reference voltage $V_{ref2}$ and output a third control signal $V_{ctr3}$. The third control signal $V_{ctr3}$ may be used to control the power conversion module 14 and implement overpower protection functions. Further, the second hysteresis comparator 53 may compare the amplified second superimposed voltage to the second reference voltage $V_{ref2}$. If the amplified second superimposed voltage is greater than the second reference voltage $V_{ref2}$, the second hysteresis comparator 53 may output a high potential to control the power conversion module 14 to stop power conversion. If the amplified second superimposed voltage is smaller than or equal to the second reference voltage $V_{ref2}$, the second hysteresis comparator 53 may output a low potential to control the power conversion module 14 to start power conversion.

In the SCR-compatible constant-voltage circuit provided by the present disclosure, the overpower protection module may include the second adder 51, the amplifier 52, and the second hysteresis comparator 53. The signal $V_{isense}$, output by the power conversion module 14, may be superimposed with the voltage at the first sampling point A, and further amplified by the amplifier 52 to obtain the amplified second superimposed voltage. The second hysteresis comparator 53 may compare the amplified second superimposed voltage with the second reference voltage $V_{ref2}$ and output the third control signal $V_{ctr3}$ to control the power conversion module 14. Thus, undesirably high output power by the SCR 15 at the maximum conduction angle may be prevented. The SCR-compatible constant-voltage circuit may be operated with improved safety and reliability.

Figure 6:
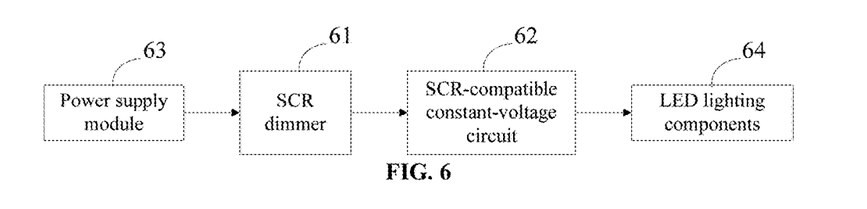
FIG. 6 is a block diagram illustrating the structure of an exemplary LED dimming circuit consistent with various embodiments of the present disclosure.

FIG. 6 illustrates the structure of the LED dimming circuit consistent with the eighth embodiment of the present disclosure. As shown in FIG. 6, the LED dimming circuit may include a SCR dimmer 61, a SCR-compatible constant-voltage circuit 62 provided by any one of embodiments of the present disclosure, a power supply module 63, and LED lighting components 64.

One terminal of the SCR dimmer 61 may be connected to the power supply module 63. The SCR-compatible constant-voltage circuit 62 may be connected to the other terminal of the SCR dimmer 61 and the LED lighting components 64 to provide a constant voltage for the LED lighting components.

Specifically, the SCR in the eighth embodiment may be the SCR 15 in any one of the embodiments of the present disclosure. The LED dimming circuit may include the SCR dimmer and any one of the constant-voltage circuits provided by the embodiments of the present disclosure. The SCR in the SCR dimmer may be connected to the power supply module 63. The SCR-compatible constant-voltage circuit 62 may be connected to the SCR and the LED load, e.g., the LED light components 64. The SCR-compatible constant-voltage circuit 62 may provide a constant voltage for the LED lighting components 64. In practice, the LED dimming circuit may be widely used in various LED lighting devices. By controlling and adjusting the SCR dimmer 61, a constant voltage may be provided to the corresponding LED lighting devices.

In the SCR-compatible constant-voltage circuit provided by the present disclosure, through the logic control among the modules, the SCR, in a certain conduction angle, may be used to ensure the circuit outputs a constant voltage in a full range of the loads. Meanwhile, the SCR-compatible constant-voltage circuit may have input undervoltage control functions and overpower protection functions.

In the LED dimming circuit provided by the present disclosure, the disclosed SCR-compatible constant-voltage circuit may be used. The brightness of the LED may be controlled and adjusted through the SCR dimmer and the SCR-compatible constant-voltage circuit. The control may be more reliable and more stable.

The ninth embodiment of the present disclosure provides an LED lighting apparatus. The LED lighting apparatus may include the LED dimming circuit and the LED lighting components. The LED dimming circuit may be connected to the LED lighting components.

The LED dimming circuit may include a SCR dimmer and a SCR-compatible constant-voltage circuit disclosed in any one of the embodiments provided by the present disclosure. The SCR in the SCR dimmer may be connected to a power supply module. The SCR-compatible constant-voltage circuit may be connected to the SCR dimmer and the LED lighting components and provide a constant voltage for the LED lighting components. In practice, the LED dimming circuit can be widely used in various LED lighting devices. By controlling the SCR dimmer, the LED dimming circuit may be used for a constant-voltage control over the LED lighting apparatus.

In the SCR-compatible constant-voltage circuit provided by the present disclosure, through the logic control among the modules, the SCR, in a certain conduction angle, may be used to ensure the circuit outputs a constant voltage in the full range of loads. Meanwhile, the SCR-compatible constant-voltage circuit may have input undervoltage control functions and overpower protection functions.

In the LED lighting apparatus provided by the present disclosure, the disclosed SCR-compatible constant-voltage circuit is included. SCR is combined with the constant-voltage circuit to control and adjust the brightness of the LED lighting apparatus. The control may be more stable and more reliable.

The embodiments disclosed herein are exemplary only. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

In the SCR-compatible constant-voltage circuit provided by the present disclosure, through the logic control among the modules, the SCR, in a certain conduction angle, may be used to ensure the circuit outputs a constant voltage in the full load range. Meanwhile, the SCR-compatible constant-voltage circuit may have input undervoltage control functions and overpower protection functions.

The LED dimming circuit provided by the present disclosure may include a SCR dimmer and a SCR-compatible constant-voltage circuit, such as those disclosed in any one of the embodiments. The SCR in the SCR dimmer may be connected to a power supply module. The SCR-compatible constant-voltage circuit may be connected to the SCR dimmer and the LED lighting components and provide a constant voltage for the LED lighting components. In practice, the LED dimming circuit can be widely used in various LED lighting devices. By controlling the SCR dimmer, the LED dimming circuit may be used for a constant-voltage control over the LED lighting apparatus.

In the LED dimming apparatus provided by the present disclosure, the disclosed SCR-compatible constant-voltage circuit is included. SCR is combined with the constant-voltage circuit to control and adjust the brightness of the LED lighting apparatus. The control may be more stable and more reliable.

REFERENCE SIGN LIST

Input undervoltage control module 11
Overpower protection module 12
Controllable load module 13
Power conversion module 14
Silicon-controlled rectifier (SCR) 15
Power supply module 16
Load module 17
first rectifying module 21
Unidirectional transmission module 22
Second rectifying module 23
Third rectifying module 24
Fourth rectifying module 25
First adder 26
Voltage sampling module 31
First hysteresis comparator 32
Resistor 41
Controllable switch 42
Second adder 51
Amplifier 52
Second hysteresis comparator 53
SCR dimmer 61
SCR-compatible constant-voltage circuit 62
Power supply module 63
LED lighting components 64

What is claimed is:

1. A silicon-controlled rectifier (SCR)-compatible constant-voltage circuit, comprising: an input undervoltage control module, a controllable load module, a power conversion module, and an overpower protection module including a second adder, an amplifier, and a second hysteresis comparator, wherein:
   one terminal of a SCR is connected to the power conversion module, and another terminal of the SCR is connected to a power supply module;
   the input undervoltage control module, the overpower protection module, and the controllable load module are each connected in parallel between a first sampling point and the power conversion module, the first sampling point being arranged between the SCR and the power conversion module;
   the power conversion module is connected to a load module and is configured to convert electric signals provided by the power supply module to a constant voltage, the power conversion module providing the constant voltage to the load module;
   the input undervoltage control module is configured to control the power conversion module to start or stop power conversion based on a comparison between a voltage at the first sampling point and a first reference voltage;
   the overpower protection module is configured to control the power conversion module to start or stop power conversion based on a comparison between the voltage at the first sampling point and a second reference voltage;
   the controllable load module is configured to maintain the SCR to be on when the power conversion module stops power conversion;
   a first input terminal of the second adder is connected to the power conversion module, and a second input terminal of the second adder is connected to the first sampling point to output a second superimposed voltage, the second superimposed voltage being a superimposition of the voltage at the first sampling point and an output voltage of the power conversion module;
   the amplifier is connected to the second adder to amplify the second superimposed voltage; and
   the second hysteresis comparator is connected to the amplifier to compare the amplified second superimposed voltage with the second reference voltage, wherein: if the amplified second superimposed voltage is greater than the second reference voltage, the second hysteresis comparator outputs a high potential to control the power conversion module to stop power conversion, and if the amplified second superimposed voltage is lower than or equal to the second reference voltage, the second hysteresis comparator outputs a low potential to control the power conversion module to start power conversion.

2. The SCR-compatible constant-voltage circuit according to claim 1, wherein:
   when the input undervoltage control module detects the voltage at the first sampling point is greater than the first reference voltage, the input undervoltage control module controls the power conversion module to start power conversion; and
   when the input undervoltage control module detects the voltage at the first sampling point is lower than or equal to the first reference voltage, the input undervoltage control module controls the power conversion module to stop power conversion.

3. The SCR-compatible constant-voltage circuit according to claim 1, wherein:
   when the overpower protection module detects the voltage at the first sampling point is greater than the second reference voltage, the overpower protection module controls the power conversion module to stop power conversion; and
   when the overpower protection module detects the voltage at the first sampling point is lower than or equal to the second reference voltage, the overpower protection module controls the power conversion module to start power conversion.

4. The SCR-compatible constant-voltage circuit according to claim 1, further including a first rectifying module, wherein:
   one terminal of the power supply module is connected to one terminal of the SCR, and the other terminal of the power supply module is connected with a first input terminal of the first rectifying module;
   the other terminal of the SCR is connected to a second input terminal of the first rectifying module;
   a first output terminal of the first rectifying module is connected to the power conversion module, and a second output terminal of the first rectifying module is connected to a low potential and the power conversion module, respectively; and
   the first sampling point is arranged to be between the first rectifying module and the power conversion module.

5. The SCR-compatible constant-voltage circuit according to claim 4, further including a unidirectional transmission module, wherein:
   the first output terminal of the first rectifying module is connected to one terminal of the unidirectional transmission module, and another terminal of the unidirectional transmission module is connected to the power conversion module to transmit current from the first rectifying module to the power conversion module along a single direction; and the first sampling point is arranged between the first rectifying module and the unidirectional transmission module.

6. The SCR-compatible constant-voltage circuit according to claim 1, further including: a second rectifying module and a third rectifying module, wherein:

one terminal of the power supply module is connected to one terminal of the SCR, and the other terminal of the power supply module is connected to a first input terminal of the second rectifying module and a first input terminal of the third rectifying module;

the other terminal of the SCR is connected to a second input terminal of the second rectifying module and a second input terminal of the third rectifying module;

a first output terminal of the second rectifying module is connected to the power conversion module, a second output terminal of the second rectifying module is connected to a low potential and the power conversion module, respectively;

a second output terminal of the third rectifying module is connected to the second output terminal of the second rectifying module; and the first sampling point is arranged to be on the first output terminal of the third rectifying module, the second output terminal of the third rectifying module being connected to the low potential.

7. The SCR-compatible constant-voltage circuit according to claim 1, further including a fourth rectifying module, wherein:

one terminal of the power supply module is connected to one terminal of the SCR, the other terminal of the power supply module is connected to a first input terminal of the fourth rectifying module;

the other terminal of the SCR is connected to a second input terminal of the fourth rectifying module;

a first output terminal of the fourth rectifying module is connected to the power conversion module, and a second output terminal of the fourth rectifying module is connected to the power conversion module and a low potential; and the voltage at the first sampling point is a sum of a voltage at a second sampling point and a voltage at a third sampling point, wherein the second sampling point is arranged at the first input terminal of the fourth rectifying module and the third sampling point is arranged at the second input terminal of the fourth rectifying module.

8. The SCR-compatible constant-voltage circuit according to claim 7, further including a first adder, wherein:

a first input terminal of the first adder is connected to first input terminal of the fourth rectifying module and a second input terminal of the first adder is connected to the second input terminal of the fourth rectifying module, the first input terminal and the second input terminal of the first adder being configured to output a first superimposed voltage, the first superimposed voltage being the sum of the voltages at the second sampling point and the third sampling point; and the first sampling point is arranged at an output terminal of the first adder.

9. The SCR-compatible constant-voltage circuit according to claim 1, wherein:

the input undervoltage control module includes a voltage sampling unit and a first hysteresis comparator;

the voltage sampling unit being configured to sample the voltage at the first sampling point for a plurality of times and output an averaged voltage value; and the first hysteresis comparator being connected to the voltage sampling module to compare the averaged voltage value with a first reference voltage, wherein if the averaged voltage value is greater than the first reference voltage, the first hysteresis comparator outputs a high potential to control the power conversion module to start power conversion; and if the averaged voltage value is lower than or equal to the first reference voltage, the first hysteresis comparator outputs a low potential to control the power conversion module to stop power conversion.

10. The SCR-compatible constant-voltage circuit according to claim 1, wherein the controllable load module comprises a resistor and a controllable switch, wherein:

the controllable switch is connected to the power conversion module, and the resistor is connected to the controllable switch in series; and the controllable switch is configured to be switched on when the power conversion module stops power conversion.

11. A light-emitting diode (LED) dimming circuit, comprising a silicon-controlled rectifier (SCR) dimmer and the SCR-compatible constant-voltage circuit according to claim 1, wherein:

one terminal of the SCR dimmer is connected to the power supply module; and the SCR-compatible constant-voltage circuit is connected to another terminal of the SCR dimmer and one or more LED lighting components to provide a constant voltage for the one or more LED lighting components.

12. A light-emitting diode (LED) lighting device, comprising the LED dimming circuit according to claim 11 and the one or more LED lighting components, wherein the LED dimming circuit is connected to the one or more LED lighting components.

* * * * *